United States Patent
Mitchell et al.

[15] 3,674,682
[45] July 4, 1972

[54] HEAVY OIL CONVERSION USING FINE PARTICLES

[72] Inventors: David S. Mitchell, San Rafael; Alan G. Bridge, El Cerrito; John W. Scott, Ross, all of Calif.

[73] Assignee: Chevron Research Company, San Francisco, Calif.

[22] Filed: Jan. 16, 1970

[21] Appl. No.: 3,304

[52] U.S. Cl.............................................208/157, 208/213
[51] Int. Cl. ..................................C10g 13/18, C10g 23/06
[58] Field of Search.................208/213, 209, 101, 106, 108, 208/110, 146, 153, 163, 164, 148, 157

[56] References Cited

UNITED STATES PATENTS

| | | | |
|---|---|---|---|
| 3,365,388 | 1/1968 | Scott, Jr.................................208/110 |
| 2,944,961 | 7/1960 | McAfee...................................208/108 |
| 3,124,518 | 3/1964 | Guzman et al..........................208/213 |
| 3,151,060 | 9/1964 | Garbo......................................208/213 |
| 3,248,319 | 4/1966 | Bowles et al............................208/110 |

FOREIGN PATENTS OR APPLICATIONS 2,005,194  12/1969  France....................................208/213

*Primary Examiner*—Delbert E. Gantz
*Assistant Examiner*—G. J. Crasanakis
*Attorney*—A. L. Snow, F. E. Johnston, C. J. Tonkin and T. G. De Jonghe

[57] ABSTRACT

A process for catalytically hydroconverting a feed heavy hydrocarbon oil to more valuable hydrocarbon liquid, using finely divided catalyst, which process comprises feeding the heavy oil upward in a vertically extending conduit in a reactor vessel, flowing fine catalyst particles upward in said conduit, allowing the heavy oil feed and the fine catalyst particles to flow out from the conduit at an upper end of the conduit, introducing hydrogen gas to the reactor vessel at a first lower part of the reactor vessel and allowing the hydrogen gas to rise upward in the reactor vessel; allowing the fine catalyst particles to settle downward in the reactor vessel outside the conduit and countercurrent to the upward rising hydrogen, and withdrawing valuable hydrocarbon liquid from a second lower part of the reactor vessel.

8 Claims, 2 Drawing Figures

INVENTORS
DAVID S. MITCHELL
ALAN G. BRIDGE
JOHN W. SCOTT, JR.

BY
ATTORNEYS

HEAVY OIL CONVERSION USING FINE PARTICLES

BACKGROUND OF THE INVENTION

This invention relates to methods and apparatus for conducting solid particle catalyzed chemical reactions and, more particularly, relates to reactions between hydrocarbons and hydrogen in the presence of fine catalyst particles in a reaction vessel.

The present invention is particularly applicable to high temperature, high pressure reactions such as the hydroconversion of heavy hydrocarbon liquids. The term "hydroconversion" is used herein to connote reactions involving the conversion of a hydrocarbon feed by reacting at least portions of the hydrocarbon feed with hydrogen to form more valuable hydrocarbon products. Hydroconversion reactions include, for example, hydrocracking, hydrofining and hydrodesulfurization.

In accordance with U.S. Pat No. 2,987,465, it has been suggested to maintain a liquid-gas-solids contact in which the solids are placed in ebullated or random motion in the liquid. This is accomplished by passing the liquids and gases in continuous liquid phase upward through a bed of particulate solids under such conditions as to accomplish a predetermined and controlled expansion of the bed over its settled volume. Upgrading of oil, removal of sulfur and organometallic compounds, and other hydrogenation reactions can be accomplished by an upflow process.

As an example of the foregoing, it has been suggested to carry out hydroconversion of heavy hydrocarbon oils under elevated temperatures in the order of 650°–850°F. and under pressures in the order of 1,000–5,000 psig by circulating the oil and hydrogen gas upward through a bed of particulate solids which may be as large as one-sixteenth to one-fourth inch but, more preferably, are 1/32 × ⅛inch extrudates.

A suitable upflow of liquid of this type at the temperature involved for the type and size particles forming the bed, is usually in the range of 10–200 gallons per minute per square foot of horizontal cross section in the reactor. With such a liquid flow, the bed of solids of the usual catalyst particles is expanded in the order of from 10–200 percent of the settled state of the solids. This expansion depends upon the size, shape and density of the particles and the viscosity and velocity of the liquid. By limiting such bed expansion, the random motion of the particles in the liquid can be made effective without carry-over of particles. But if the particles are of fine size (for example, less than 40 mesh size) the particles are carried in the liquid at a relatively low flow velocity for the liquid, compared to the fluidizing velocity for the liquid when using more normal, larger, particles. This presents a serious disadvantage in the use of fine particles in a fluidized bed operated in accordance with prior art methods, particularly those prior art methods wherein the liquid oil flows upward through the reactor and then is withdrawn from the upper part of the reactor vessel. Because the fine particles are easily carried upward by the liquid oil feed, particularly in the case of relatively high viscosity oils such as heavy oils, the bed of fine particles is greatly expanded and thus a relatively large reaction vessel is required, compared to the reaction vessel required, for example, if the reaction is carried out using a fixed bed of catalyst. Because the reaction is carried out at high pressure and high temperature, the reaction vessel is expensive, and increasing the size of the reaction vessel is, of course, expensive. In addition, the fine particles are relatively easily simple carried out of the top of the reaction vessel with the upward flowing liquid feed, thus resulting in poor conversion and poor utilization of the fine catalyst particles.

However, there are a number of important advantages achieved in using small catalyst particles if the aforementioned difficulties are eliminated, or reduced. Effectiveness factors, Thiele moldulus and other criteria have been used to quantify the advantages obtained by using fine catalyst particles by considering the interrelationships between reaction rates, diffusion rates and catalyst size. These considerations become particularly important for cases where one reactant diffuses slowly into the porous structure of the catalyst as, for example, in the hydroconversion of heavy hydrocarbon oils which contain a large number of large and complex molecules.

Thus, it is particularly desirable to have a satisfactory reaction system involving the use of fine catalyst particles. The term "fine catalyst particles" is used herein to mean catalyst particles which are no larger than 20 mesh and, as will be described hereinbelow, the present invention is particularly advantageously applied to catalyst particles which are smaller than 40 Tyler mesh and usually the present invention is applied to catalyst particles which are 100 mesh size or smaller. All mesh sizes referred to herein are Tyler mesh size. A Tyler 3-mesh size is equivalent to approximately ¼-inch size and a Tyler 20 mesh is equivalent to approximately 1/32-inch size.

SUMMARY OF THE INVENTION

According to the present invention, a process is provided for catalytically hydroconverting a feed heavy hydrocarbon oil to more valuable hydrocarbon liquid using finely divided catalyst which process comprises flowing the heavy oil upward in a vertically extending conduit in a reactor vessel, flowing fine catalyst particles upward in said conduit, allowing the heavy oil feed and the fine catalyst particles to flow out from the conduit at an open upper end of the conduit, introducing hydrogen gas to the reactor vessel at a first lower part of the reactor vessel and allowing the hydrogen gas to rise upward in the reactor vessel; allowing the fine catalyst particles to settle downward in the reactor vessel outside the conduit and countercurrent to the upward rising hydrogen, and withdrawing valuable hydrocarbon liquid from the reactor vessel.

The process of the present invention is largely based on the important concept of providing a process embodiment wherein fine catalyst particles settle or move downward in a reaction vessel, instead of being overfluidized and thus requiring a larger and more expensive reaction vessel as is the case where the catalyst particles are fluidized upward by upward flowing heavy oil.

The process of the present invention is particularly advantageously applied to the use of very fine catalyst particles, such as 40 mesh or smaller, and the process of the present invention is very advantageously applied when fine catalyst particles of 100 mesh size or smaller are used.

As indicated in the discussion of the background, hydroconversion of heavy oils such as various heavy vacuum gas oils, residua and solvent deasphalted heavy oils or residua, does not appear to be satisfactorily achievable in a normal upflow fluidized reactor when fine particles of catalyst are used. Overfluidization, thus requiring a large reactor volume, inefficient hydrocarbon catalyst contacting and inefficient catalyst use appear to result when heavy oils are hydroconverted using fine catalyst particles and norm l prior art fluidization techniques.

However, the present invention provides a process which is particularly advantageously applied to the hydroconversion of heavy oils using fine catalyst particles. The term "heavy oils" or "heavy hydrocarbon oils" is used herein to mean oils 50 volume percent or more of which boil above 650°F. at atmospheric pressure. The 50 percent boiling point of such heavy oils may be determined by an ASTM D-1160 method. Hydroconversion processes which can be carried out according to the process of the present invention include hydrocracking, hydrodesulfurization, hydrodenitrification, hydrodemetalation and hydrogenation. Suitable conditions for these hydroconversion reactions usually range from about 500°–900°F., and a pressure of about 200 to 10,000 psig.

Hydrodesulfurization of heavy oils is very advantageously accomplished by the process of the present invention. Hydrodesulfurization is carried out in the presence of about 500–5,000 standard cubic feet of hydrogen per barrel of oil feed and at a temperature in the reactor between about 600° and 850°F. and in the presence of fine catalyst particles comprising Group VI and/or Group VIII metals or metal compounds on or combined with supports such as silica and/or alumina.

In the process of the present invention, hydrogen is preferably introduced through a multiple outlet distributor located in the lower part of the reactor vessel. The hydrogen then travels upward in the reactor vessel countercurrent to downward settling catalyst and generally downward circulating hydrocarbon oil. The hydrogen is preferably introduced through a number of openings in the distributor in the lower part of the vessel and the countercurrent flow of the hydrogen versus the slowly downward settling catalyst and slowly circulating hydrocarbon is particularly advantageous in that the gas holdup and distribution will be better than in a conventional fluidized bed and thus localized hydrogen starvation will be alleviated.

In the process of the present invention, it is also preferable to introduce or allow a small additional quantity of hydrogen into the lower open end of the conduit in the reactor vessel. The hydrogen introduced into the lower end of the conduit is important, in that it serves to avoid hydrogen starvation in the conduit. Although in the process of the present invention the hydroconversion reactions are believed to occur primarily outside of the conduit, it is, of course, advantageous to utilize fully the reaction volume inside of the conduit.

Preferably, the hydrogen is introduced to a first lower part of the reactor vessel and the converted hydrocarbons are withdrawn from a second lower part of the reactor vessel. The adjectives "first" and "second" are used primarily to indicate that the respective hydrogen inlet and hydrocarbon withdrawal are not at exactly the same place. In general, by "lower part of the reactor vessel" is meant near the bottom of the reactor vessel. Thus, for example, the hydrogen might be introduced at any point below the 50 percent point along the vertical length or axis of the vessel and likewise the product hydrocarbon might be withdrawn at any point below the 50 percent point along the vertical length of the reactor vessel. However, preferably, the hydrogen is introduced in the lower one-fourth or one-eighth portion of the reactor vessel and the product hydrocarbon is withdrawn preferably in the lower one-third of the reactor vessel. Because the upward flowing hydrogen serves to cause considerable mixing of the hydrocarbon material in the portion of the reactor vessel outside the conduit, normally it is satisfactory to withdraw product hydrocarbon from the reactor vessel at any of a large number of points, so long as the withdrawal is not within a relatively short distance from the upper outlet end of the conduit. However, it is preferred to withdraw the product hydrocarbon from the lower part of the reaction vessel as, for example, the lower one-third or one-sixth or at or near the bottom of the reactor vessel, as then the hydrocarbon will have had a longer time in which to react, particularly if the downward flow of settling catalyst and circulating hydrogen tends to approach plug flow.

The hydrocarbon oil withdrawn from the reactor will typically contain a considerable amount of entrained fine catalyst particles. Preferably these entrained particles are separated from the product hydrocarbon oil and at least part of the separated particles are returned to the reactor. Preferably the separation is accomplished in a hydroclone.

The term "conduit" is used more broadly than merely as a circular pipe. Although a preferred embodiment is a circular conduit with a concentric pipe extending into the lower open end of the conduit with feed introduced to the conduit via the concentric inner pipe, other arrangements may be made employing the same basic scheme. For example, instead of a circular conduit, the conduit may be a slot extending along the length of a cylinder lying on its side. The flow arrangement for the settling of the fine catalyst and the circulation of the fine catalyst particles and hydrocarbon is achieved in essentially the same manner by introducing fresh feed through a smaller slot or other defined relatively small opening(s) extending into the lower open end of the larger slot.

DETAILED DESCRIPTION OF THE DRAWINGS

Figure 1:
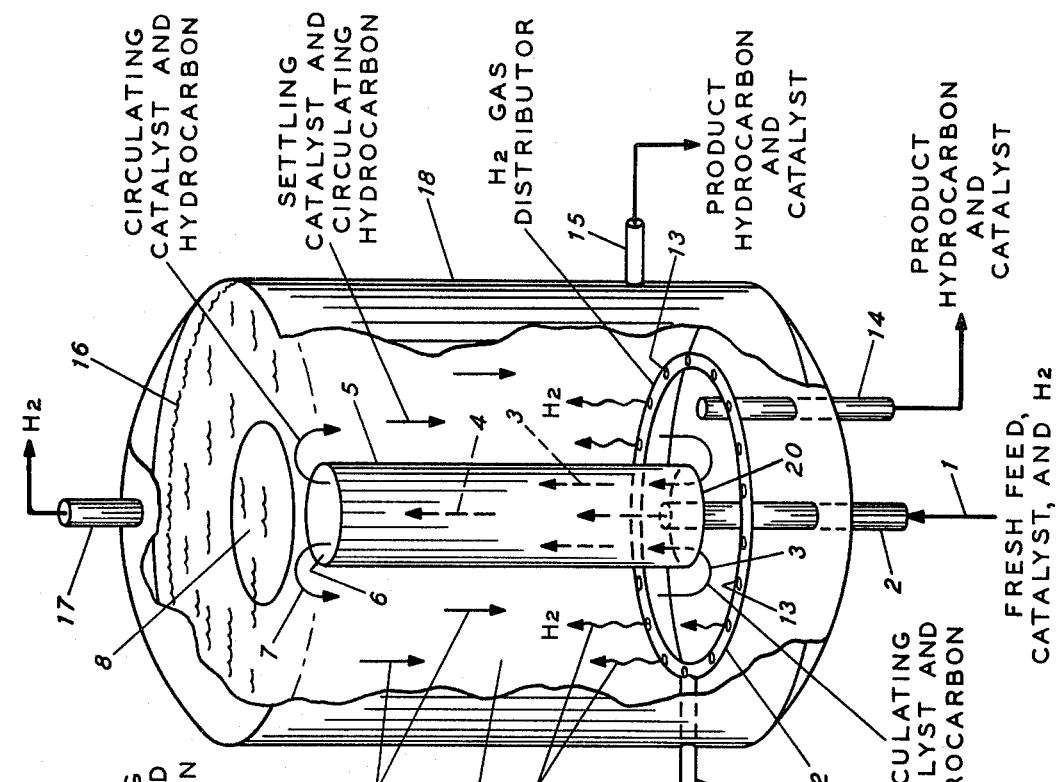
FIG. 1 and FIG. 2 are schematic diagrams indicating preferred process and apparatus embodiments for the present invention.

Referring now more particularly to FIG. 1, fresh feed, catalyst and a small amount of hydrogen are introduced as indicated by arrow 1 to inlet nozzle or pipe 2, extending upward into the lower part of reactor 18. Preferably, the fresh feed is a heavy oil, for example, a heavy residuum containing organic sulfur compounds. Preferably, the catalyst is 100 mesh or smaller catalyst particles. These fine catalyst particles are very effective in hydrotreatment, particularly hydrodesulfurization, of heavy oils compared to hydrotreatment using larger catalyst particle sizes.

Because pipe 2 is of a relatively small diameter compared to vertically or upward-extending conduit 5, the velocity of the liquid and other materials issuing from pipe 2 is relatively high. This tends to create some suction of the lower open end of conduit 5. The lower open end of conduit 5 is designated by numeral 20. Because of the suction and relatively high velocity upward in conduit 5, compared to the velocity in the annular space outside conduit 5, fine catalyst which has settled downward, as well as hydrocarbon material in the lower annular space of the vessel are drawn or flow into conduit 5 as indicated by the arrows designated by numeral 3. The material rises upward in conduit 5 as indicated by arrow 4.

The upper open end of conduit 5 is designated by numeral 6. Hydrocarbon, fine catalyst particles and some dissolved hydrogen flow out of the open upper end of conduit 5 as designated by arrow 7. The hydrocarbon and fine catalyst particles are encouraged to make a gentle 180° turn by baffle 8. The spacing between baffle 8 and the upper open end of conduit 5 is preferably about one or two times the diameter of the conduit. The spacing between the bottom of reactor 18 and the open bottom end of conduit 5 is preferably about one-half to 1½ times the diameter of the conduit. If the conduit is, for example, 8-inch diameter pipe, the vertical clearance between the bottom edge of the conduit and the bottom inside surface of the reactor can be between about two inches and 24 inches, but 4 inches to 16 inches is preferred. Spacing the lower open end of the conduit no more than about one conduit diameter above the bottom of the reactor aids the oil flow indicated by arrow 3 to circulate catalyst particles that might lie on the bottom of the reactor if the spacing was larger.

Sufficient cross section area is provided in the annular space 21 so that the fine catalyst particles settle downward as indicated by arrow 9. The hydrocarbon also sets up a circulation pattern which is mostly concurrent with the settling and circulating catalyst along the route which is schematically described by arrows 4, 7, 9 and 3.

After the catalyst settles or flows down to the lower end of the reactor, it tends to be drawn toward the lower open end of conduit 5 and then drawn into the lower open end of conduit 5 for recirculation upward to the upper end of the reactor vessel. It is to be noted that this is in distinction to that type of prior art flow sequence wherein catalyst particles are fluidized upward in a reactor vessel and then flow downward in a standpipe located in the center of the reactor vessel. The flow of hydrocarbon liquid, catalyst and hydrogen up conduit 5 is turbulent flow, especially in comparison to the flow outside the conduit in annular space 21. Usually the Reynolds number inside the conduit is above about 2,000 while the Reynolds number outside is usually below 2,000. The cross-sectional flow area of the conduit is preferably about 2 percent to 15 percent that of annular space 21. Fluid velocity in the conduit is preferably between 0.03 feet per second and 3 feet per second. Fluid velocity in the annular space 21 is preferably between about 0.3 and 30 feet per hour. Although the superficial fluid velocity is low in the annular space, so as to tend towards laminar flow, good contacting is achieved in the annular space due to the agitation caused by the countercurrent flowing hydrogen gas.

Hydrogen flows countercurrent to the downward settling catalyst and downward settling hydrocarbon as indicated by arrow 10. The hydrogen is introduced via inlet 1 and hydrogen gas distributor 12. The hydrogen gas distributor may assume a variety of shapes, but it is preferred that at least 10 or 20 small openings are provided for hydrogen to issue from the inlet distributor. Provision for a considerable number of feed hydrogen openings in the distributor will enhance the good hydrogen distribution which results from the operation of the process of the present invention involving downward flow of hydrocarbons and catalysts countercurrent to the upward flowing hydrogen. Hydrogen outlet openings in the hydrogen inlet gas distributor are designated by numeral 13. Because there is relatively high hydrogen consumption in the process of the present invention compared to processes carried out using fixed catalyst beds, in many instances it is desirable to introduce additional hydrogen near the vertical center of the reactor to avoid hydrogen-lean area inside the reactor. Such additional hydrogen may be introduced via an additional hydrogen inlet distributor like distributor 12, but located approximately half-way up from the open bottom end of conduit 5.

Unreacted hydrogen is withdrawn from the upper end of the reactor vessel as indicated by arrow 17. The upper liquid level in the reactor vessel is indicated by arrow 16. Product hydrocarbon, as well as some fine catalyst particles, are withdrawn from the lower end of the reactor vessel at openings 14 and/or 15. Preferably, the hydrocarbon is withdrawn near the lower part of the reactor vessel, as then a longer reaction period is provided for that hydrocarbon which tends to circulate along the path described by arrows 1, 4, 7 and 9. In any event, it is not desired to withdraw the hydrocarbon near the upper open end of conduit 5, as then there is too great a chance of withdrawing hydrocarbon feed which has not had an adequate opportunity to react.

Product hydrocarbon withdrawn from the reactor vessel, for example, in the case of a hydrocarbon oil which is treated in the reactor under hydroesulfization conditions, contains substantially less organic sulfur compounds than in the fresh feed introduced via pipe 2. Hydrogen sulfide is dissolved to a certain extent in the hydrocarbon withdrawn from the reaction vessel, but this hydrogen sulfide may be readily stripped from the product hydrocarbon. A portion of the hydrogen sulfide which is formed due to the hydrodesulfurization reactions in reactor 18 also leaves reactor 18 via line 17 with the unreacted hydrogen.

Figure 2:
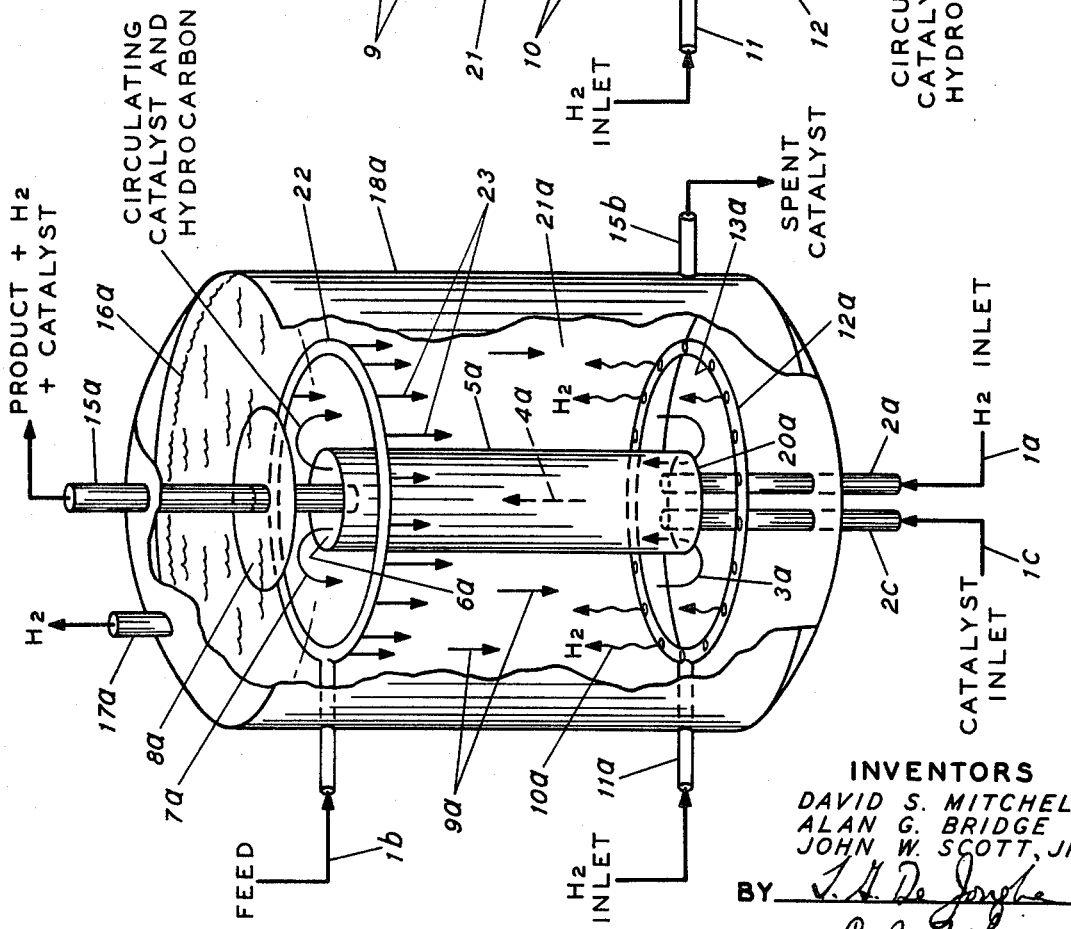

FIG. 2 schematically illustrates an alternate embodiment of the present invention wherein operation is similar in certain basic respects to the operation illustrated by FIG. 1. In both the FIG. 1 and FIG. 2 operation fine catalyst particles and liquid hydrocarbons flow downward in the reactor countercurrent to upward flowing hydrogen. Hydrogen also flows concurrent with the hydrocarbons in the upcomer conduit designated by 5a in FIG. 2, as in conduit 5 in FIG. 1. In both operations hydrogen starvation (i.e., areas of insufficient hydrogen for satisfactory hydroconversion) is substantially avoided, and relatively good reaction efficiency can be achieved. Generally, corresponding streams and apparatus in FIGS. 1 and 2 are indicated by using the same numeral in both figures but with a suffix "a" added for FIG. 2 numerals. Operation as shown in FIG. 2 differs from FIG. 1 operation primarily in that the feed is introduced near the top of the reactor, for example, in the upper one-third, rather than the bottom of the reactor, and product, hydrogen and catalyst withdrawal is from the top of the reactor rather than only withdrawing hydrogen from the top of the reactor. As shown in FIG. 2, products, hydrogen and catalyst particles are withdrawn via line 15a from near the upper outlet portion of the upcomer 5a. Alternately the product may be withdrawn from above baffle 8a with substantially less catalyst particles in the product withdrawal. In this instance spent catalyst, as for example, catalyst particles which are relatively heavy due to coke and/or metal deposits on the catalyst, may be withdrawn via line 15b near the bottom of the reactor. In either event the product is preferably passed to a hydroclone to separate entrained fine catalyst particles from the treated oil.

Although various specific embodiments of the invention have been described and shown, it is to be understood that they are meant to be illustrative only and not limiting. Certain features may be changed without departing from the spirit or essence of the invention. It is apparent that the present invention has broad application to the hydroconversion of oils using downward flow of hydrocarbons and downward flow and/or settling of catalyst countercurrent to upward flow of hydrogen gas. Accordingly, the present invention is not to be construed as limited to the specific embodiments illustrated, but only as defined in the appended claims.

What is claimed is:

1. A process for catalytically hydroconverting a feed heavy hydrocarbon oil to more valuable hydrocarbon liquid, using finely divided catalyst, which process comprises flowing the heavy oil upward in a vertically extending conduit in a reactor vessel, said conduit being centrally located therein; flowing fine catalyst particles upward in said conduit; allowing the heavy oil and the fine catalyst particles to flow out from the conduit at an open upper end of said conduit and to pass into the reactor space external to said conduit; introducing hydrogen gas to the reactor vessel at a first lower part of the reactor vessel and flowing the hydrogen gas upward in the reactor vessel external to the conduit; allowing the fine catalyst particles and heavy oil to settle downward in the reactor vessel outside the conduit and countercurrent to the upward rising hydrogen; reacting said heavy oil with said countercurrent flowing hydrogen gas outside the conduit while said heavy oil is in contact with the settling catalyst; and withdrawing said valuable hydrocarbon liquid from a second lower part of said reactor vessel.

2. A process in accordance with claim 1, wherein at least the majority of the fine catalyst particles are 40 mesh size, or smaller.

3. A process in accordance with claim 1, wherein at least the majority of the fine catalyst particles are 100 mesh size or smaller.

4. A process in accordance with claim 2, wherein at least 50 volume percent of the feed heavy hydrocarbon oil boils above 650°F.

5. A process in accordance with claim 4, wherein the feed heavy hydrocarbon oil contains organic sulfur compounds which are reacted with the hydrogen gas, so as to produce hydrogen sulfide and thus accomplish hydrodesulfurization of feed heavy hydrocarbon oil.

6. A process in accordance with claim 2 wherein the hydrogen gas is introduced to the reactor vessel so as to flow upward in the reactor vessel both outside of the conduit and inside of the conduit.

7. A process in accordance with claim 1, wherein the fine catalyst particles are recirculated by means including a pipe or inlet nozzle located concentrically within the lower part of said conduit so as to draw fine catalyst particles and hydrocarbon liquid into the conduit.

8. A process in accordance with claim 7, wherein the conduit defines a circular cross-sectional inside flow area.

* * * * *